United States Patent
Yu et al.

(10) Patent No.: US 8,401,769 B2
(45) Date of Patent: Mar. 19, 2013

(54) CONTROL METHOD OF RESTARTING ENGINE IN AN AT ISG AUTOMOBILE

(75) Inventors: Jiyong Yu, Pocheon-si (KR); Sejun Kim, Seoul (KR); Chongah Gwon, Hwaseong-si (KR); Junghwan Bang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/302,955

(22) Filed: Nov. 22, 2011

(65) Prior Publication Data

US 2012/0136554 A1 May 31, 2012

(30) Foreign Application Priority Data

Nov. 30, 2010 (KR) .................. 10-2010-0120655

(51) Int. Cl.
*F02N 11/10* (2006.01)
*B60W 10/06* (2006.01)
*F02D 11/10* (2006.01)

(52) U.S. Cl. ..... 701/112; 701/113; 123/399; 123/179.4; 180/65.28

(58) Field of Classification Search .................. 701/104, 701/112, 113; 123/179.4, 399; 108/65.28
See application file for complete search history.

(56) References Cited

U.S. PATENT DOCUMENTS

| 6,892,128 B2 * | 5/2005 | Asakawa et al. | 701/103 |
| 6,915,782 B2 * | 7/2005 | Hanada et al. | 123/399 |
| 8,285,470 B2 * | 10/2012 | Wang et al. | 701/103 |
| 2005/0003926 A1 * | 1/2005 | Hanada et al. | 477/3 |
| 2010/0280737 A1 * | 11/2010 | Ewert et al. | 701/102 |

FOREIGN PATENT DOCUMENTS

| JP | 2001-159321 A | 6/2001 |
| JP | 2001-207884 A | 8/2001 |

* cited by examiner

*Primary Examiner* — Erick Solis
(74) *Attorney, Agent, or Firm* — Morgan, Lewis & Bockius LLP

(57) ABSTRACT

A control method of restarting an engine of an AT ISG vehicle may include a first step of restarting the engine when a state of the vehicle satisfies a restart condition after an idle-stop, a second step of keeping a throttle valve constant at a first critical value or less when a positional value of an acceleration pedal may be equal to a second critical value or more after the first step, and a third step of opening a throttle valve until the positional value of the acceleration pedal detected by the acceleration pedal position sensor and a positional value of the throttle valve detected by a throttle valve position sensor may be matched after a critical time passes, a shifting may be completed after the restarting, or when the acceleration pedal may be pressed down less than at the second critical value after the first step.

4 Claims, 4 Drawing Sheets

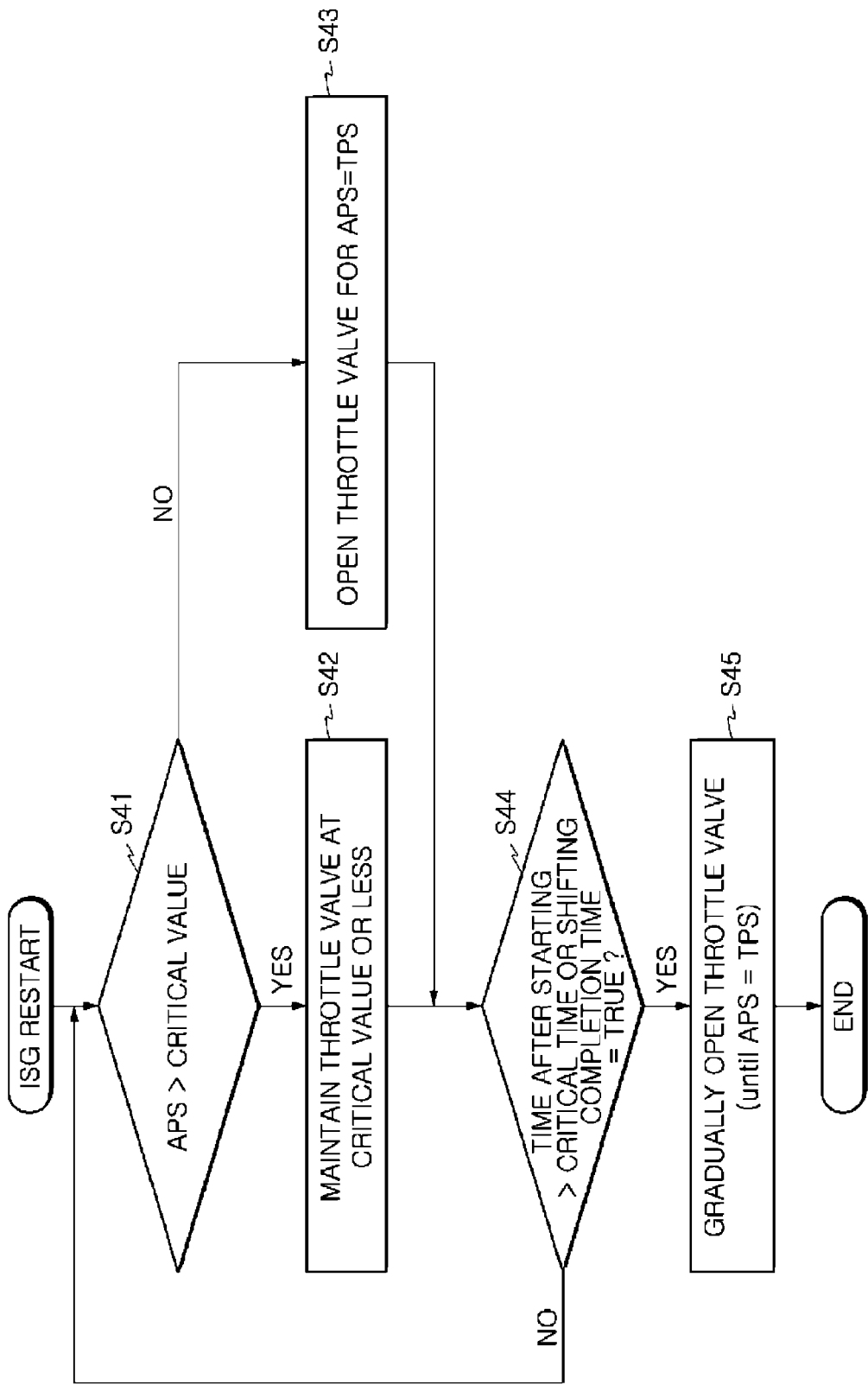

CONTROL METHOD OF RESTARTING ENGINE IN AN AT ISG AUTOMOBILE

CROSS-REFERENCE TO RELATED APPLICATIONS

The present application claims priority to Korean Patent Application Number 10-2010-0120655 filed Nov. 30, 2010, the entire contents of which application is incorporated herein for all purposes by this reference.

BACKGROUND OF THE INVENTION

1. Field of the Invention

The present invention relates to an AT ISG vehicle equipped with an ISG (Idle Stop and Go) device, and particularly, to an engine restart control method that improves operability of restarting by reducing engine torque when an engine is restarted from an idle-stop state.

2. Description of Related Art

Recently, technologies for improving fuel efficiency to reduce $CO_2$ have been developed in various ways.

The ISG system is a device that stops the engine when a vehicle stops and automatically starts the engine when the vehicle starts.

The ISG device allows normal traveling by automatically idle-stopping the engine under predetermined conditions while receiving information, such as the speed of the vehicle, the revolution speed of the engine, and the temperature of the cooling water, and then automatically restarting (Go) the engine when restart is required by the driver's intention and the conditions of the vehicle itself.

The condition for entering the idle-stop in the ISO device is a state with the engine sufficiently warmed up, that is, a stop state where the vehicle speed is not detected and the transmission is at the neutral stage with the cooling water maintained at a predetermined temperature or more, and when a predetermined time passes after the brake pedal is operated, the engine is stopped to increase fuel efficiency and stabilize emission. It is possible to achieve an effect of an increase in fuel efficiency of about 5 to 15% by applying the ISO device.

In general, in order to apply the ISG device to an AT vehicle, it is necessary to additionally provide an electric sub-oil pump that supplies oil to the transmission with the engine idle-stopped, which cost competitiveness of inexpensive vehicles. Accordingly, an AT ISG system without a sub-oil pump has been developed.

FIG. 1 is an operational flowchart showing a control method of a common AT ISG vehicle.

An engine is stopped (S12) when an engine stop condition set in advance in a vehicle is satisfied while the vehicle travels (S11). Thereafter, when an engine restart condition set in advance in the vehicle is satisfied (S13), a starter motor is operated (S14) such that the engine is restarted and the vehicle is started (S15).

FIG. 2 is a graph showing clutch slip generated in restarting of the engine of an AT ISG vehicle without a sub-oil pump.

In the AT ISG vehicle without a sub-oil pump, since oil is not supplied into the transmission in the idle-stop state, the low oil pressure is exerted in the transmission. In this state, when shifting is attempt by starting (accelerating) of the vehicle after the engine is restarted, clutch slip is generated and a large temporary shock is generated to suddenly assist the oil pressure in the transmission until the oil pressure in the transmission becomes a predetermined level due to the low oil pressure. Further, the clutch of the transmission is damaged by repetitive clutch slip and operability is deteriorated by the shock of the transmission.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a control method that prevents sudden shifting by reducing engine torque in restarting of the engine in an AT ISG vehicle without a sub-oil pump.

A control method of restarting an engine of an AT ISG vehicle, may include a first step of restarting the engine when a state of the vehicle satisfies a restart condition after an idle-stop, a second step of keeping a throttle valve constant at a first critical value or less when a positional value of an acceleration pedal detected by an acceleration pedal position sensor is equal to a second critical value or more after the first step, and a third step of opening a throttle valve until the positional value of the acceleration pedal detected by the acceleration pedal position sensor and a positional value of the throttle valve detected by a throttle valve position sensor are matched after a critical time passes, a shifting is completed after the restarting, or when the acceleration pedal is pressed down less than at the second critical value after the first step.

The third step of opening the throttle valve gradually opens the throttle valve.

The throttle valve is maintained at the first critical value or less without fully opening as much as pressing down of the acceleration pedal.

After the second step, the throttle valve is opened until the positional value of the acceleration pedal detected by the acceleration pedal position sensor and the positional value of the throttle valve detected by the throttle valve position sensor are matched, when the critical time passes or shifting is completed after restarting.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 4 is an operation flowchart showing a control method of restarting an engine of an AT ISG vehicle according to an exemplary embodiment of the present invention.

Figure 1:
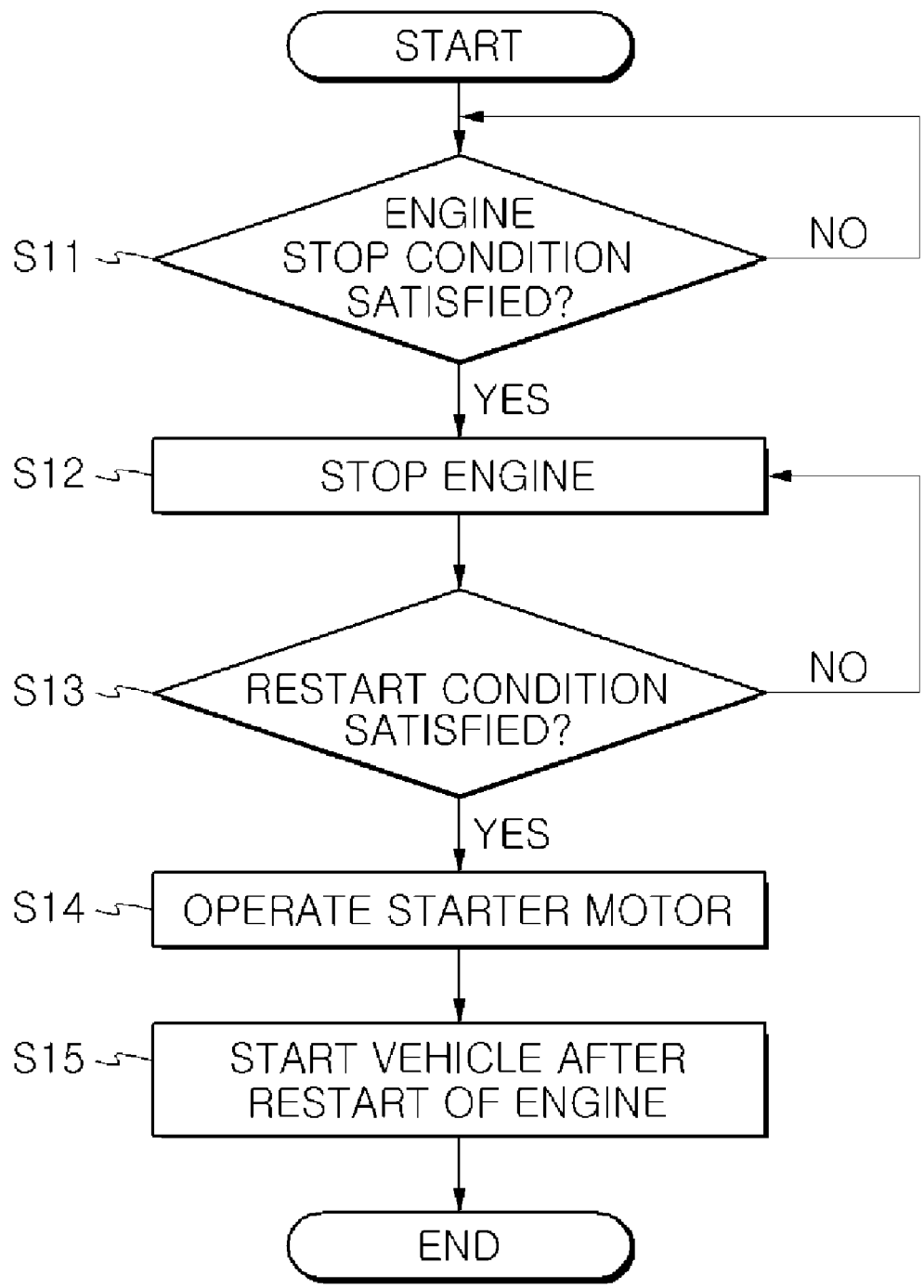
FIG. 1 is an operational flowchart showing a control method of a common AT ISG vehicle.
Figure 2:
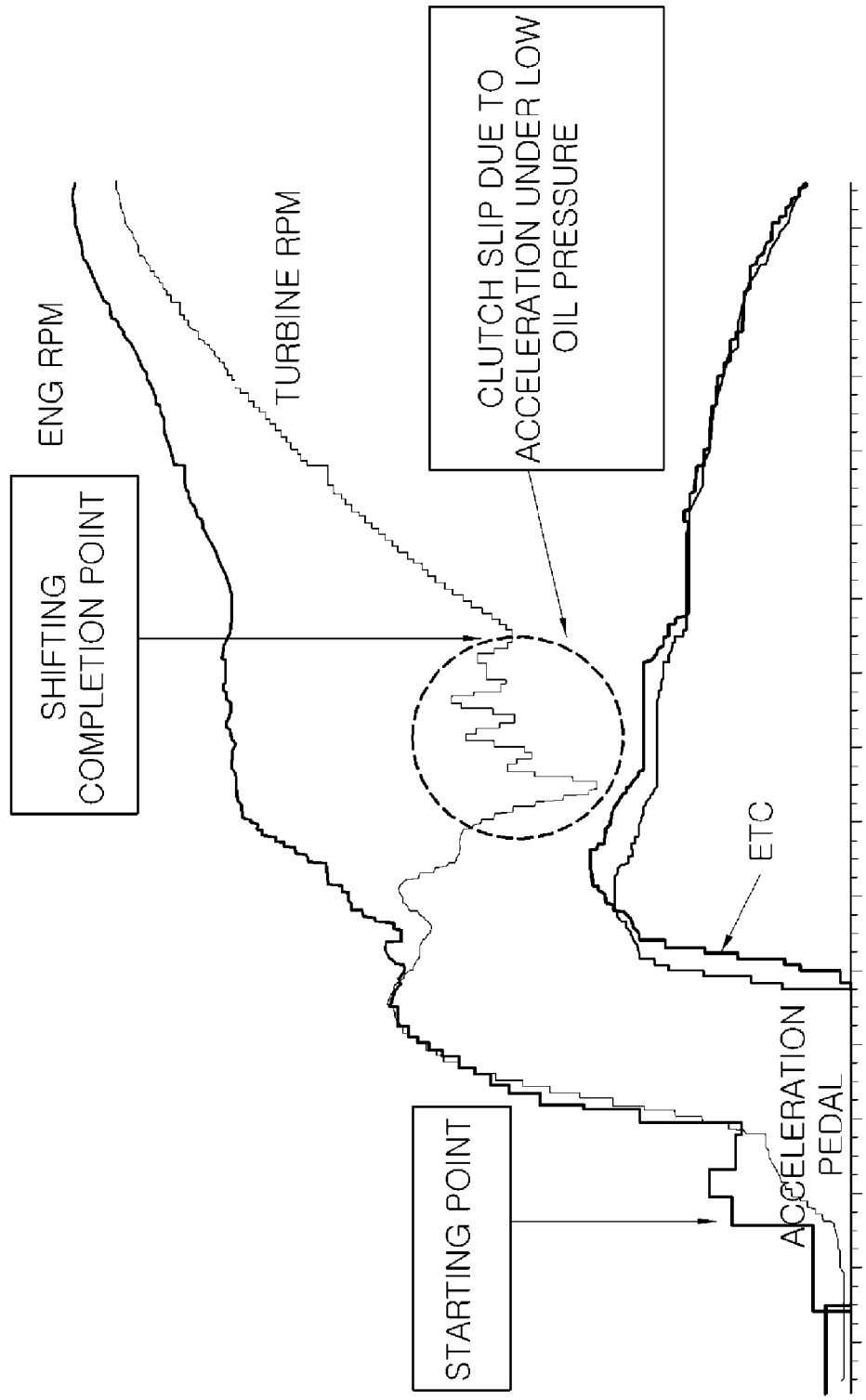
FIG. 2 is a graph showing clutch slip generated in restarting of the engine of an AT ISO vehicle without a sub-oil pump.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereafter, a control method of restarting an engine of an AT ISG vehicle according to an exemplary embodiment of the present invention is described in detail with reference to the accompanying drawings.

Figure 3:
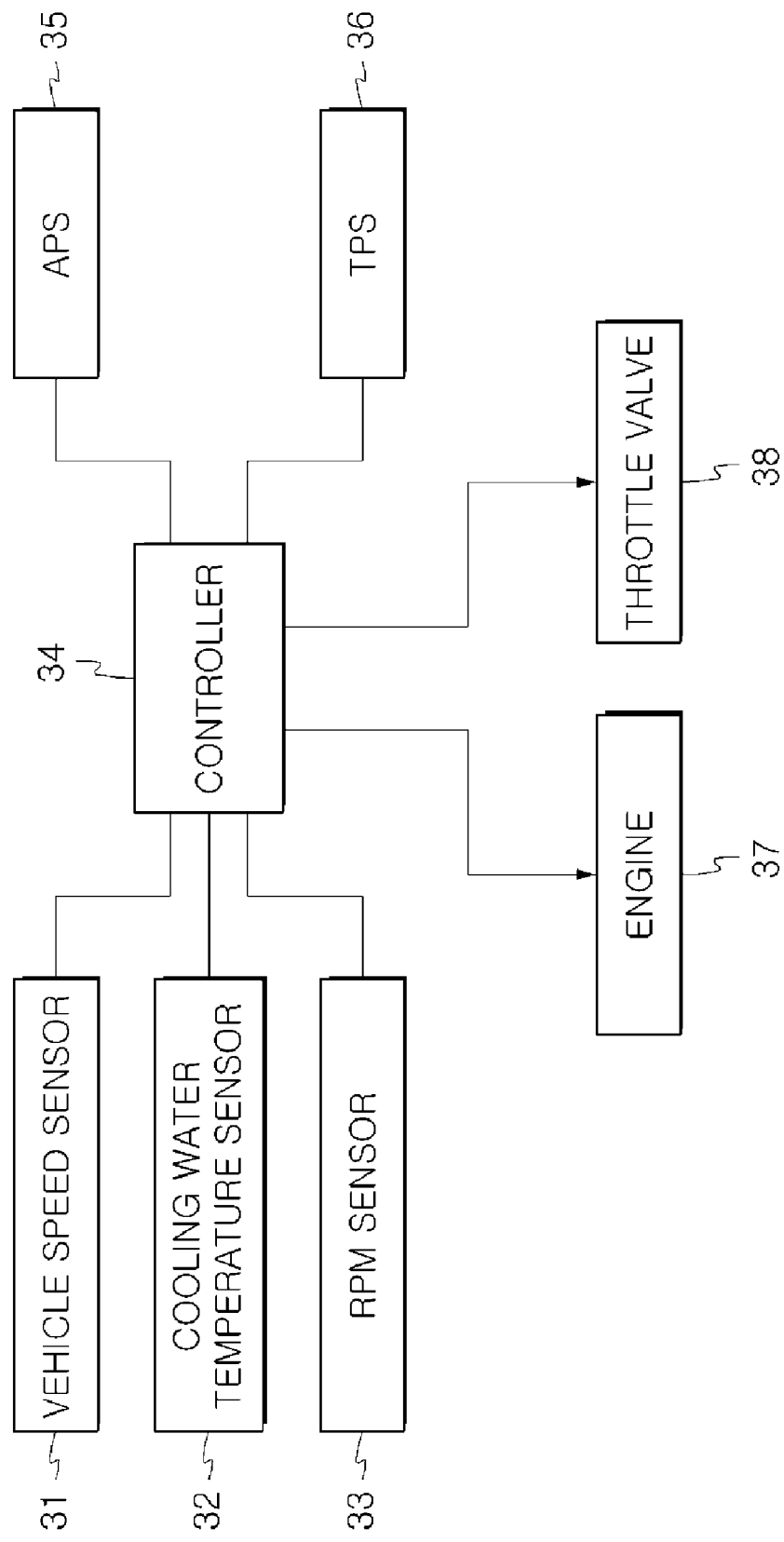
FIG. 3 is a diagram showing the configuration of an AT ISG system according to an exemplary embodiment of the present invention.

FIG. 3 is a diagram showing the configuration of an AT ISG system according to an exemplary embodiment of the present invention.

An AT ISG system according to an exemplary embodiment of the present invention includes a controller 34.

Controller 34 receives state information of a vehicle from a vehicle speed sensor 31, a cooling water temperature sensor 32, and an RPM sensor 33 and stops an engine 37 when the state of the vehicle satisfies an idle-stop condition. Further, when the state of the vehicle satisfies a restart condition after the idle-stop, engine 37 is restarted.

Controller 34 according to an exemplary embodiment of the present invention receives a positional value of the acceleration pedal operated by the driver from an acceleration pedal position sensor (APS) 35 after the idle-stop, and maintains a throttle valve 38 at a critical value or less when the driver accelerates the vehicle at a critical value or more by suddenly pressing down the acceleration pedal. Thereafter, controller 34 opens throttle valve 38 until the positional value of the acceleration pedal of acceleration pedal position sensor 35 and the positional value of the throttle valve of a throttle valve position sensor (TPS) 36 are matched, when a critical time passes or shifting is completed after restarting.

FIG. 4 is an operation flowchart showing a control method of restarting an engine of a controller in an AT ISG vehicle according to an exemplary embodiment of the present invention.

The process that the controller idle-stops the engine is the same as that of the related art and is not described.

When the state of the vehicle satisfies a restart condition after the idle-stop, controller 34 restarts engine 37. Controller 34 opens the throttle valve (S43) such that the positional value of the acceleration pedal of acceleration pedal position sensor 35 and the positional value of the throttle valve of throttle valve position sensor 36 are matched, when the positional value of the acceleration pedal of acceleration pedal position sensor 35 is detected and the positional value of the acceleration pedal does not exceed a critical valve while the driver slows presses down the acceleration pedal (S41).

However, when the driver suddenly presses down the acceleration pedal and the positional value of the acceleration pedal exceeds the critical value (S41), the throttle valve is maintained at the critical value or less without fully opening as much as pressing-down of the acceleration pedal (S42).

Thereafter, controller 34 gradually opens the throttle valve (S45) until the positional value of the acceleration pedal of acceleration pedal position sensor 35 and the positional value of the throttle valve of throttle valve position sensor 36 are matched, when the critical time passes or shifting is completed after restarting (S44).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method of restarting an engine of an AT ISG vehicle, comprising:
    a first step of restarting the engine when a state of the vehicle satisfies a restart condition after an idle-stop;
    a second step of keeping a throttle valve constant at a first critical value or less when a positional value of an acceleration pedal detected by an acceleration pedal position sensor is equal to a second critical value or more after the first step; and
    a third step of opening a throttle valve until the positional value of the acceleration pedal detected by the acceleration pedal position sensor and a positional value of the throttle valve detected by a throttle valve position sensor are matched after a critical time passes, a shifting is completed after the restarting, or when the acceleration pedal is pressed down less than at the second critical value after the first step.

2. The control method as defined in claim 1, wherein the third step of opening the throttle valve gradually opens the throttle valve.

3. The control method as defined in claim 1, wherein the throttle valve is maintained at the first critical value or less without fully opening as much as pressing down of the acceleration pedal.

4. The control method as defined in claim 3, wherein after the second step, the throttle valve is opened until the positional value of the acceleration pedal detected by the acceleration pedal position sensor and the positional value of the throttle valve detected by the throttle valve position sensor are matched, when the critical time passes or shifting is completed after restarting.

* * * * *